(No Model.)
J. F. McELROY.
ELECTRIC HEATER.
No. 601,585. Patented Mar. 29, 1898.
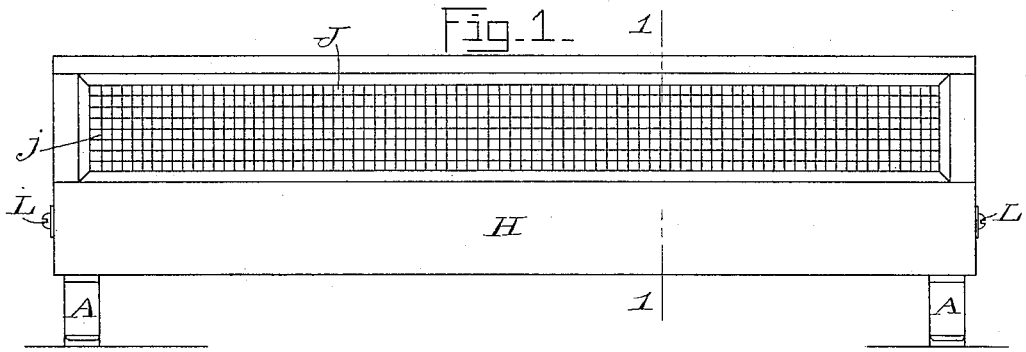
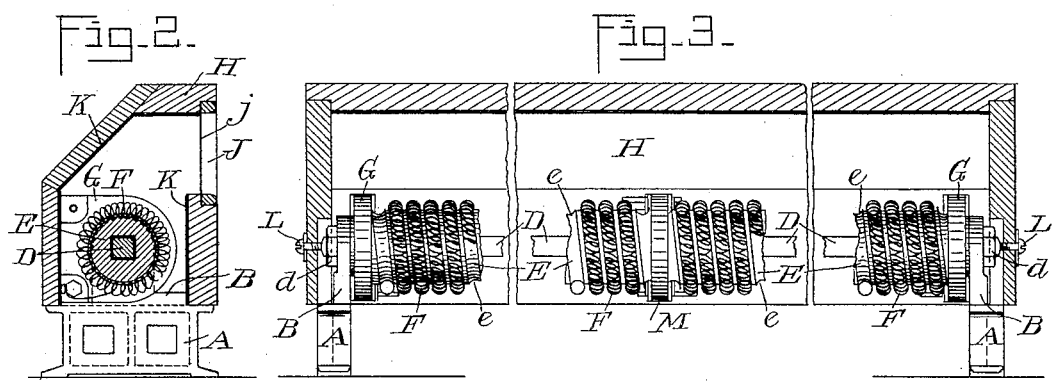
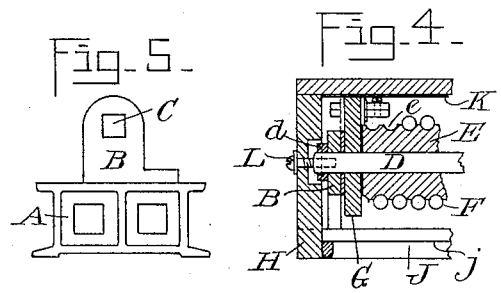

UNITED STATES PATENT OFFICE.

JAMES F. McELROY, OF ALBANY, NEW YORK, ASSIGNOR TO THE CONSOLIDATED CAR-HEATING COMPANY.

ELECTRIC HEATER.

SPECIFICATION forming part of Letters Patent No. 601,585, dated March 29, 1898.

Application filed February 14, 1895. Serial No. 538,434. (No model.)

*To all whom it may concern:*

Be it known that I, JAMES F. MCELROY, a citizen of the United States, residing in the city and county of Albany, State of New York, have invented a new and useful Improvement in Electric Heaters, of which the following is a specification.

My invention relates to improvements in electric radiators of the type shown in my Patent No. 500,288, although the form is in itself not essential, as it might be modified considerably. I accomplish this object by means of the mechanism illustrated in the accompanying drawings, in which—

Figure 1 is a front elevation. Fig. 2 is a cross-section along the line 1 1 on Fig. 1. Fig. 3 is a longitudinal vertical section. Fig. 4 is a horizontal section, and Fig. 5 is an end view of the support.

Similar letters refer to similar parts throughout the several views.

The supports A have a bracket B, provided with a squared hole C, the bracket B resting upon or formed integral with the foot-block A, which forms a support for the radiator. One end of the squared spindle D rests in the hole C. Upon the spindle D is placed a porcelain core E, which is usually provided with a spiral groove *e* along its surface, about which groove is coiled a wire F. An insulating-block G is placed between the porcelain core E and the bracket B. I usually place a nut *d* on the end of the spindle D for the purpose of holding the spindle firmly in position.

Resting upon the support A and at the rear thereof I place the box H, which is provided with an opening J along the upper front thereof, within which I usually place a screen *j*. The rear portion of the box opposite said opening J is inclined toward the front, and the interior of the box is lined with asbestos or other non-conducting material K. The box is held in position by means of bolts or screws L, passing through the end piece into the end of the spindle D, as shown in Fig. 4.

When desired, the porcelain core, instead of extending the full length of the heater, may be joined, as shown in Fig. 3, by means of a suitable coupling-block M.

Heretofore the porcelain cores have been placed upon a round spindle, and, the spindle being continued through the brackets, there was nothing to prevent the brackets turning upon the spindle or the spindle turning within the porcelains, and as such heaters are usually made up of a number of porcelains upon each spindle, and as the periphery of the porcelain was formed into a spiral groove within which the resistance-wire was placed, it became necessary that the groove of one section should register with the groove of the succeeding section upon the spindle. In handling and operating the heaters it was difficult to keep the parts in the proper relative position, and therefore I have made this improvement, which specifically consists in squaring the spindle and holes through the supporting-brackets, squaring the holes in the porcelains and so adjusting them that the spiral grooves of one porcelain will register with that of another, and thus avoiding all liability of derangement either in handling or by virtue of the effect of the expansion and contraction of the resistance-wire, which in some instances has turned the porcelains and caused short-circuiting.

What I claim as my invention, and desire to secure by Letters Patent, is—

1. In an electric heater, the combination of supporting-brackets having square openings therein, a squared spindle carried by said brackets and placed in said openings, a core of insulating material having a square perforation adapted to be placed on said spindle, a coiled resistance on said insulating material, and means for holding the same in position, substantially as described.

2. In an electric heater, the combination of supporting-brackets having square openings therein, a squared spindle carried by said brackets and placed in said openings, a core of insulating material having a square perforation adapted to be placed on said spindle, a coiled resistance on said insulating material, a nut adapted to be placed on each end of said spindle to hold the same in position, a screw adapted to be placed through the ends of an inclosing box into the ends of said spindle, and means for suitably connecting up the resistance, substantially as described and for the purpose set forth.

JAMES F. McELROY.

Witnesses:
HOMER J. NODINE,
WILLIAM P. EDDY.